US 12,252,414 B2

United States Patent
Fang et al.

(10) Patent No.: US 12,252,414 B2
(45) Date of Patent: Mar. 18, 2025

(54) METHOD FOR PREPARING TERNARY CATHODE PRECURSOR MATERIAL WITH LOW SULFUR CONTENT AND HIGH SPECIFIC SURFACE AREA

(71) Applicants: GUANGDONG BRUNP RECYCLING TECHNOLOGY CO., LTD., Guangdong (CN); HUNAN BRUNP RECYCLING TECHNOLOGY CO., LTD., Guangdong (CN)

(72) Inventors: Zhenqi Fang, Guangdong (CN); Changdong Li, Guangdong (CN); Genghao Liu, Guangdong (CN); Dingshan Ruan, Guangdong (CN); Qianqian Shi, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

(*) Notice: Subject to any disclaimer, the term of this patent is extended or adjusted under 35 U.S.C. 154(b) by 0 days.

(21) Appl. No.: 18/558,156

(22) PCT Filed: Sep. 22, 2022

(86) PCT No.: PCT/CN2022/120617
§ 371 (c)(1),
(2) Date: Oct. 30, 2023

(87) PCT Pub. No.: WO2024/011751
PCT Pub. Date: Jan. 18, 2024

(65) Prior Publication Data
US 2024/0327239 A1 Oct. 3, 2024

(30) Foreign Application Priority Data

Jul. 14, 2022 (CN) .......................... 202210829321.7

(51) Int. Cl.
*C01G 53/44* (2025.01)

(52) U.S. Cl.
CPC .......... *C01G 53/44* (2013.01); *C01P 2004/03* (2013.01); *C01P 2006/12* (2013.01); *C01P 2006/40* (2013.01)

(58) Field of Classification Search
CPC .. C01G 53/44; C01P 2004/03; C01P 2006/12; C01P 2006/40
See application file for complete search history.

(56) References Cited

U.S. PATENT DOCUMENTS

2014/0322604 A1  10/2014  Kitagawa et al.

FOREIGN PATENT DOCUMENTS

| CN | 102324514 | 1/2012 |
| CN | 103342395 | 10/2013 |

(Continued)

OTHER PUBLICATIONS

International Search Report and Written Opinions of the International Searching Authority issued for the PCT application No. PCT/CN2022/120617 on Mar. 27, 2023, (16 pages), with English translation.
First Office Action for the family patent No. 2022108293217 on Jan. 28, 2023, (10 pages), with English translation.
First Search for the family patent No. 2022108293217 on Jan. 28, 2023, (4 pages), with English translation.

*Primary Examiner* — Wayne A Langel
*Assistant Examiner* — Syed T Iqbal
(74) *Attorney, Agent, or Firm* — Leason Ellis LLP

(57) ABSTRACT

The present disclosure discloses a method for preparing a ternary cathode precursor material with low sulfur content and high specific surface area, and belongs to the field of lithium ion battery materials. In the present disclosure, by (Continued)

using a continuous filter with a spraying device for concentrating a reaction material, sulfur impurities can be uniformly removed in a reaction stage, and neither are the reaction environment and the production efficiency affected, nor does introduction of new impurities occur. In addition, by removing the mother liquor by means of negative pressure suction filtration, the material can be oxidized uniformly in a controlled manner, and the specific surface area of the ternary cathode precursor material is uniformly increased, so that during sintering, lithium ions more easily enter the interior of particles of the ternary cathode precursor material, thus exerting a higher capacity.

10 Claims, 2 Drawing Sheets

(56) References Cited

FOREIGN PATENT DOCUMENTS

| | | | | |
|---|---|---|---|---|
| CN | 105304864 | 2/2016 | | |
| CN | 109279661 | 1/2019 | | |
| CN | 110817975 | 2/2020 | | |
| CN | 111170375 | 5/2020 | | |
| CN | 111807421 | 10/2020 | | |
| CN | 112582605 | 3/2021 | | |
| CN | 112713269 | 4/2021 | | |
| CN | 112713269 A | * 4/2021 | ........ | H01M 10/0525 |
| CN | 114573052 | 6/2022 | | |
| JP | 2018070442 | 5/2018 | | |

* cited by examiner

METHOD FOR PREPARING TERNARY CATHODE PRECURSOR MATERIAL WITH LOW SULFUR CONTENT AND HIGH SPECIFIC SURFACE AREA

CROSS-REFERENCE TO RELATED APPLICATIONS

The present application is a national phase entry under 35 USC § 371 of International Application PCT/CN2022/120617, filed Sep. 22, 2022, which claims the benefit of and priority to Chinese Patent Application No. 202210829321.7, filed Jul. 14, 2022, the entire disclosures of which are incorporated herein by reference.

TECHNICAL FIELD

The present disclosure relates to the field of lithium ion battery materials, in particular to a method for preparing a ternary cathode precursor material with a low sulfur content and a high specific surface area.

BACKGROUND

In recent years, with the increasing concern of the society on energy issues, various high-tech electronic products have been developed rapidly, and the development of energy storage materials has also entered a period of rapid development. At present, lithium ion batteries are the most widely used in the field of electric power and energy storage, and nickel-cobalt-manganese ternary materials have the largest market share among lithium ion battery cathode materials.

At present, nickel-cobalt-manganese ternary materials on the market are mostly produced by means of a coprecipitation method, that is, a metal sulfate, a precipitant and a complexing agent are added to a reaction kettle in parallel, crystallized and precipitated under the controlled technological conditions, and then washed and dried to obtain a hydroxide solid powder. In this preparation method, the use of a sulfate as a raw material results in the concentration of sulfate radicals in the reaction system being too high, and during precipitation, the sulfate radicals are adsorbed on the surface of precipitate particles and enriched in the interior and on the surface of a ternary cathode precursor material as the particles grow, thereby affecting the electrical properties of the ternary material.

To solve this problem, a current conventional treatment method involves alkali washing or alkali leaching in a washing process section, however, this can only reduce sulfur on the surface of the product. Chinese patent CN 112582605 A discloses that during precipitation, when particles grow to a certain particle size, the feed is stopped, the precipitate is washed and then the particles are returned to a reaction kettle for further growth. Although this can remove sulfur impurities from various shells in stages, stopping feeding reduces the production efficiency, and only the impurities in spherical shells with specific radius can be removed, resulting in uneven enrichment of sulfur impurities in the spheres. Chinese patents CN 110817975 A and CN 103342395 A disclose that the concentration of sulfate radicals in the reaction environment is reduced by replacing the mother liquor in the reaction process, so as to achieve the purpose of reducing sulfur impurities. However, this method requires maintaining the stability of the reaction environment and accurately supplementing a sulfate raw material, a precipitant and a complexing agent; in addition, accurate control of parameters such as the temperature of a supplementary solution is also required, the control is complicated, and the refinement requirements are high, and the operation difficulty is great; furthermore, the liquid supplementing process increases the water consumption per unit product and increases the production cost. Chinese patent CN 109279661 A discloses a method for adding an additive and a surfactant during precipitation to reduce the surface energy of the precipitate, so as to reduce the adsorption of sulfur impurities by product particles; however, the additive and surfactant may also remain in the interior and on the surface of the product, leading to the introduction of new impurities.

Therefore, the development of a method for preparing a nickel-cobalt-manganese ternary material which can reduce the introduction of sulfur impurities from the source, without introducing other new impurities and reducing production efficiency, is a hot research topic at present.

SUMMARY

An object of the present disclosure is to provide a method for preparing a ternary cathode precursor material with reduced introduction of sulfur impurities in order to overcome the above-mentioned shortcomings of the prior art. The ternary cathode precursor material prepared by this method has not only a relatively low sulfur content but also a high specific surface area.

To achieve the above object, the technical solution used by the present disclosure is: a method for preparing a ternary cathode precursor material with a low sulfur content and a high specific surface area, comprising the following steps:

S1. mixing a soluble salt solution of mixed nickel, cobalt and manganese metals, an alkali liquor and a complexing agent at a desired ratio, and stirring the mixture in a reaction kettle;

S2. concentrating the material in the reaction kettle using a continuous filter with a spraying device, wherein a mother liquor in the material is subjected to negative pressure suction filtration to form a filter cake, a hot alkali liquor is then sprayed to the filter cake by means of the spraying device, the filter cake comes into contact with oxygen, and finally, the filter cake is scraped off, and the material is returned to the reaction kettle for further growth; and S3. after the material grows to a desired particle size, stopping feeding, and subjecting the material to aging, washing with water, drying, screening and demagnetization to obtain the ternary cathode precursor material with low sulfur content and high specific surface area.

In the present disclosure, the spraying device is installed on the continuous filter and the continuous filter with the spraying device is used for concentrating the material in the reaction kettle. A mother liquor is removed by means of negative pressure suction filtration in a front section of the continuous filter, the material can be oxidized uniformly in a controlled manner, the contact area between oxygen and the material is increased, thereby improving the oxidation efficiency and avoiding the introduction of an oxidant into the reaction kettle to introduce impurities and cause uncontrollable oxidation. The specific surface area of the ternary cathode precursor material is uniformly increased, and during the sintering of the ternary material, lithium ions more easily enter the interior of the particles, thus exerting a higher capacity. In the later stage, hot alkali is evenly sprayed on the filter cake by means of the spraying device which has the same width as a filter belt. $SO_4^{2-}$ on the surface of the material particles and at a certain depth can be removed. By means of the negative pressure filtration, the filtrate can be collected for recycling. Furthermore, the atmosphere above the filter cake is controlled such that a certain amount of oxygen comes into contact with the filter cake layer evenly. In addition, by controlling the oxidation amount, the specific surface of the precipitate is increased.

In the present disclosure, spraying is carried out during the growth of the material, such that the material is alkali washed while growing, which overcomes the defect that traditional hot alkali washing can only remove sulfur impurities from the surface and the outermost layer to an extent of 1-2 μm, thereby reducing the introduction of sulfur impurities from the source.

Preferably, in step S1, the soluble salt solution is a sulfate solution.

More preferably, in step S1, the ionic concentration of the mixed nickel, cobalt and manganese metals in the soluble salt solution is 1-3 mol/L.

Preferably, in step S1, the alkali liquor is a sodium hydroxide solution or a potassium hydroxide solution.

More preferably, in step S1, the alkali liquor has a concentration of 30-35%. If the concentration of the alkali liquor is too low, water in the solution will increase, causing the spraying efficiency to be reduced.

Preferably, in step S1, the complexing agent is aqueous ammonia, hydrazine hydrate or ethylenediamine tetraacetic acid (EDTA).

Preferably, in step S1, the volume ratio of the soluble salt solution of mixed nickel, cobalt and manganese metals to the alkali liquor is (66-200):(34-40).

It should be noted that in the present disclosure, the volume ratio of the soluble salt solution of mixed nickel, cobalt and manganese metals to the alkali liquor is determined by the ionic concentration of the mixed nickel, cobalt and manganese metals and the concentration of alkali liquor, and the molar ratio of the mixed nickel, cobalt and manganese metal ions to hydroxide ions in the alkali liquor is 2:1.

Preferably, in step S1, the volume ratio of the soluble salt solution of mixed nickel, cobalt and manganese metals to the complexing agent is 100:5-10.

It should be noted that in the present disclosure, the molar ratio of the mixed nickel, cobalt and manganese metal ions to complexing ions in the complexing agent is 0.01:0.5.

Preferably, in step S1, the reaction kettle has a temperature of 50-70° C.

Preferably, in step S1, the stirring speed is 200-500 rpm.

Preferably, in step S2, the thickness of the filter cake is <10 cm. If the thickness of the filter cake is too large, the efficiency of hot alkali spraying will be affected.

Preferably, in step S2, the feeding speed of the material during concentration is 8-12 m/h.

Preferably, in step S2, the oxygen concentration is 15-25%.

Preferably, in step S3, the particle size of the material is 10-15 μm.

It should be noted that the particle size of the material is determined according to experimental requirements, and in the present disclosure, the particle size of the material is 10-15 μm.

Preferably, in step S3, the hot alkali liquor has a temperature of 65-85° C., a concentration of 1-5%, and a spraying rate of 0.5-3 $m^2$/h.

The beneficial effects of the present disclosure lie in that: the present disclosure provides a method for preparing a ternary cathode precursor material with a low sulfur content and a high specific surface area, wherein by using the continuous filter with the spraying device for concentrating the reaction material, sulfur impurities can be uniformly removed in the reaction stage, the environment of the reaction system and the production efficiency are hardly affected, and also, no new impurities will be introduced. By removing the mother liquor by means of negative pressure suction filtration, the material can be oxidized uniformly in a controlled manner, and the specific surface area of the ternary cathode precursor material is uniformly increased, so that during the sintering of the ternary material, lithium ions more easily enter the interior of the particles, thus exerting a higher capacity. The alkali liquor used in the present disclosure during spraying can be recycled, and also, no additional alkali washing is required for the subsequent washing of the ternary cathode precursor material, thereby reducing the consumption of washing water and alkali and the discharge of waste water.

DETAILED DESCRIPTION

In order to better illustrate the object, technical solution and advantages of the present disclosure, the present disclosure will be further illustrated below in conjunction with specific examples.

Example 1

Figure 1:
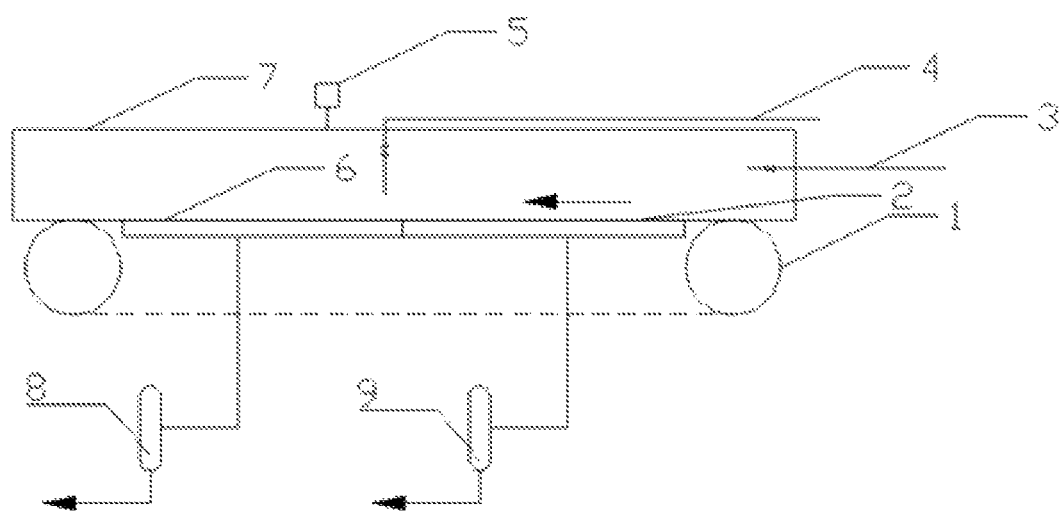
FIG. 1 is a functional schematic diagram of each part of the continuous filter with the spraying device according to the present disclosure, wherein 1. filter cloth transmission shaft, 2. mother liquor filter tray, 3. atmosphere supplement, 4. hot alkali spraying, 5. oxygen partial pressure meter, 6. alkali liquor filter tray, 7. outer cover, 8. alkali liquor recovery, and 9. mother liquor recovery.
Figure 2:
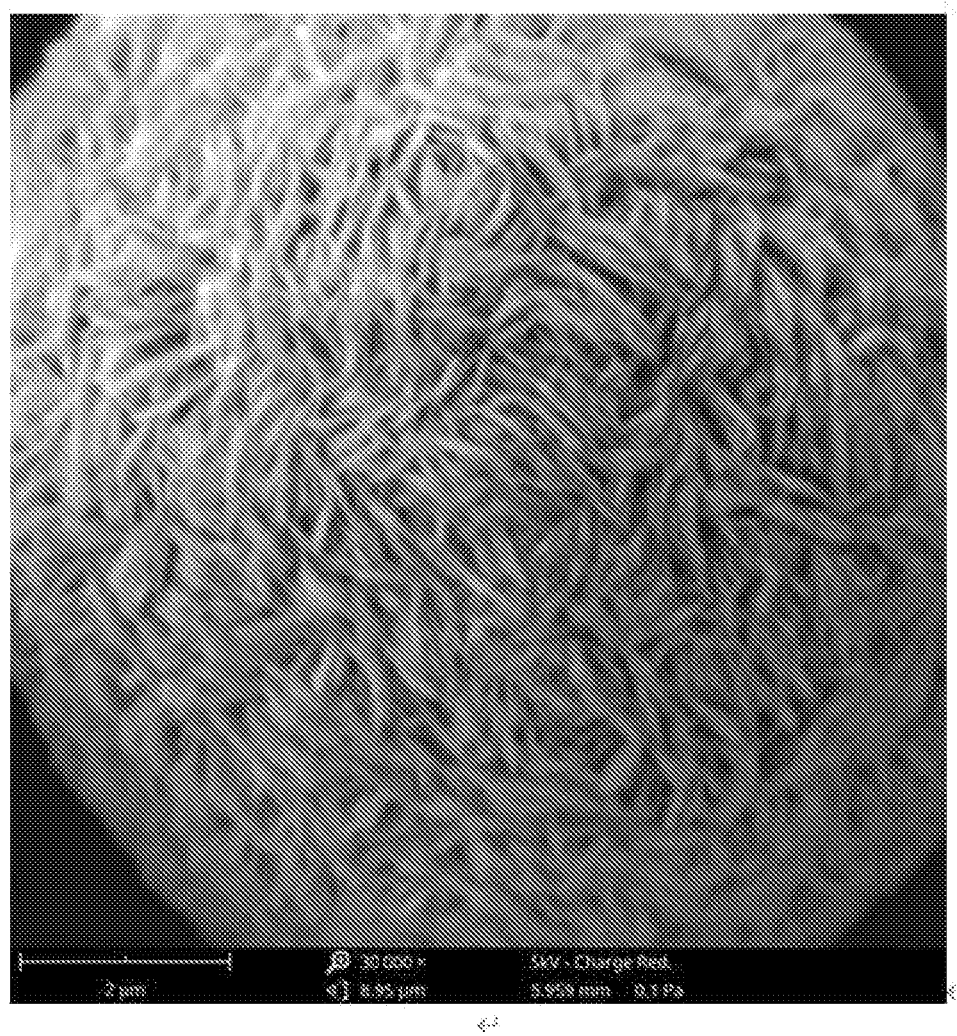
FIG. 2 is an SEM image of the ternary cathode precursor material with low sulfur content and high specific surface area of Example 1.

This example was an example of the method for preparing a ternary cathode precursor material with a low sulfur content and a high specific surface area according to the present disclosure. The method for preparing the ternary cathode precursor material with low sulfur content and high specific surface area of this example comprised:

S1. adding a 2 mol/L sulfate solution of mixed nickel, cobalt and manganese metals, 32% sodium hydroxide and 20% aqueous ammonia to a reaction kettle in parallel at a volume ratio of 100:37:8, and stirring the mixture at a speed of 300 rpm at a temperature of 60° C.;

S2. transporting the material overflowed from the reaction kettle to the filter shown in FIG. 1 by means of a pump, wherein, the mother liquor in the material was subjected to negative pressure suction filtration, a baffle plate was adjusted to control the thickness of the filter cake to be 7 cm, the feeding speed was 10 m/h, the oxygen concentration above the filter cake was 18%, the hot alkali temperature was 80° C., the concentration of hot alkali was 2%, and the spraying rate of hot alkali was 1 $m^3$/h; and the material was transported to an end of the filter, scraped off by a scraper, crushed by a pair of rollers, and then returned to below the liquid level in the reaction kettle; and S3. after the material in the reaction kettle grew to 15 μm, stopping feeding, and subjecting the material to washing with water in a centrifuge and drying in a disc dryer to obtain the ternary cathode precursor material with low sulfur content and high specific surface area.

Example 2

The differences between this example and Example 1 only lay in that: in step S1, the volume ratio of the sulfate solution of mixed nickel, cobalt and manganese metals to the sodium hydroxide to the aqueous ammonia was 100:37:6; in step S2, the oxygen concentration above the filter cake was 20%; and in step S3, after the material in the reaction kettle grew to 10 μm, feeding was stopped.

Example 3

The difference between this example and Example 1 only lay in that: in step S1, the sulfate solution of mixed nickel, cobalt and manganese metals had a molar concentration of 1 mol/L.

Example 4

The difference between this example and Example 1 only lay in that: in step S1, the sulfate solution of mixed nickel, cobalt and manganese metals had a molar concentration of 3 mol/L.

Example 5

The difference between this example and Example 1 only lay in that: in step S1, the volume ratio of the sulfate solution of mixed nickel, cobalt and manganese metals to the aqueous ammonia was 100:5.

Example 6

The difference between this example and Example 1 only lay in that: in step S1, the volume ratio of the sulfate solution of mixed nickel, cobalt and manganese metals to the aqueous ammonia was 100:10.

Comparative Example 1

The difference between this comparative example and Example 1 only lay in that: in step S2, no hot alkali spraying was used.

Comparative Example 2

The differences between this comparative example and Example 1 only lay in that: in step S2, no hot alkali spraying was used, and in step S3, hot alkali washing was added in the stage of washing in a centrifuge.

Comparative Example 3

The difference between this comparative example and Example 1 only lay in that: in step S2, instead of introducing air, nitrogen was used and brought into contact with the filter cake.

Comparative Example 4

The differences between this comparative example and Example 1 lay in that: in step S2, the material in the reaction kettle overflowed to a general microporous concentrator for concentration, and in step S3, hot alkali washing was added in the stage of washing in a centrifuge.

Effect Example

The sulfur contents of the ternary cathode precursor materials of Examples 1-6 and Comparative Examples 1-4 above were measured, and the specific surface area was tested by means of a BET test method. The results were as shown in Table 1 below.

TABLE 1

| No. | S content (wt %) | BET ($m^2/g$) |
| --- | --- | --- |
| Example 1 | 0.035 | 16.7 |
| Example 2 | 0.030 | 18.5 |
| Example 3 | 0.032 | 17.2 |
| Example 4 | 0.047 | 16.3 |
| Example 5 | 0.038 | 17.6 |
| Example 6 | 0.032 | 15.9 |
| Comparative Example 1 | 0.280 | 14.3 |
| Comparative Example 2 | 0.195 | 14.8 |
| Comparative Example 3 | 0.055 | 10.2 |
| Comparative Example 4 | 0.205 | 9.7 |

In the results as shown in Table 1, in Examples 1-6, the use of hot alkali liquor spraying for removing sulfur impurities during the material growth process had remarkable sulfur removal effects, resulted in a relatively low sulfur content, and could remove sulfur impurities from the source. Moreover, by controlling the oxygen content above the filter cake for oxidizing the material, whiskers could be obviously refined, the morphology of the ternary cathode precursor material was uniform, and the specific surface area of the ternary cathode precursor material was significantly increased. Whereas, Comparative Example 1 had a higher sulfur content because no hot alkali spraying was used. In Comparative Example 2, although hot alkali washing was used, conventional alkali washing was used in the washing stage of step S3, so that only about 30% of sulfur impurities could be removed, causing the sulfur content to be as high as 0.195%. In Comparative Example 3, the specific surface area of the final ternary cathode precursor material was lower because the material was not oxidized. In Comparative Example 4, since no negative pressure suction filtration and no hot alkali spraying were used and conventional alkali washing was carried out in the washing stage of step S3, the final ternary cathode precursor material had a higher sulfur content and also a lower specific surface area.

In conclusion, the method for preparing a ternary cathode precursor material according to the present disclosure can prepare a ternary cathode precursor material with a low sulfur content and a high specific surface area without affecting production efficiency, and reduce the consumption of water and alkali and the discharge of wastewater during preparation, thus having obvious cost advantages.

Finally, it should be noted that the above embodiments are only used to illustrate the technical solution of the present disclosure, rather than limiting the scope of protection of the present disclosure. Although the present disclosure has been described in detail with reference to the preferred embodiments, those of ordinary skill in the art should understand that the technical solution of the present disclosure can be modified or equivalently substituted without departing from the essence and scope of the technical solution of the present disclosure.

The invention claimed is:

1. A method for preparing a ternary cathode precursor material, comprising the following steps:
   S1. mixing a soluble salt solution of mixed metals of nickel, cobalt and manganese, an alkali liquor and a complexing agent, and stirring a resulting mixture in a reaction kettle;
   S2. concentrating a reacted material in the reaction kettle using a continuous filter with a spraying device, which comprises removing a mother liquor in the reacted material by negative pressure suction filtration to form a filter cake, then spraying a hot alkali liquor to the filter cake by means of the spraying device, contacting the filter cake with oxygen, and finally scrapping the filter cake off; and returning a resulting material to the reaction kettle for further growth; and
   S3. after the material grows to a particle size of 10 μm to 15 μm, stopping feeding, and subjecting a resulting material to aging, washing with water, drying, screening and demagnetization to obtain the ternary cathode precursor material.

2. The method for preparing the ternary cathode precursor material according to claim 1, wherein in step S1, the soluble salt solution is a sulfate solution.

3. The method for preparing the ternary cathode precursor material according to claim 1, wherein in step S1, a ionic concentration of the mixed metals of nickel, cobalt and manganese in the soluble salt solution is 1 mol/L to 3 mol/L.

4. The method for preparing the ternary cathode precursor material according to claim 1, wherein in step S1, the alkali liquor is a sodium hydroxide solution or a potassium hydroxide solution.

5. The method for preparing the ternary cathode precursor material according to claim 1, wherein in step S1, the alkali liquor has a concentration of 30% to 35%.

6. The method for preparing the ternary cathode precursor material according to claim 1, wherein in step S1, a volume ratio of the soluble salt solution of mixed metals of nickel, cobalt and manganese to the alkali liquor is (66-200):(34-40).

7. The method for preparing the ternary cathode precursor material according to claim 1, wherein in step S1, a volume ratio of the soluble salt solution of mixed metals of nickel, cobalt and manganese to the complexing agent is 100:5-10.

8. The method for preparing the ternary cathode precursor material according to claim 1, wherein in step S1, the reaction kettle has a temperature of 50° C. to 70° C. and a stirring speed of 200 rpm to 500 rpm.

9. The method for preparing the ternary cathode precursor material according to claim 1, wherein in step S2, a thickness of the filter cake is less than 10 cm.

10. The method for preparing the ternary cathode precursor material according to claim 1, wherein in step S3, the hot alkali liquor has a temperature of 65° C. to 85° C., a concentration of 1% to 5%, and a spraying rate of 0.5 $m^2$/h to 3 $m^2$/h.

* * * * *